(12) United States Patent
Julliard et al.

(10) Patent No.: US 7,712,828 B2
(45) Date of Patent: May 11, 2010

(54) SADDLE POST SUPPORTING DEVICE

(75) Inventors: Eric Julliard, Nevers (FR); Frederic Roudergues, Nevers (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 11/913,339

(22) PCT Filed: Apr. 14, 2006

(86) PCT No.: PCT/FR2006/000834

§ 371 (c)(1),
(2), (4) Date: Jul. 7, 2008

(87) PCT Pub. No.: WO2006/120311

PCT Pub. Date: Nov. 16, 2006

(65) Prior Publication Data

US 2008/0258517 A1    Oct. 23, 2008

(30) Foreign Application Priority Data

May 4, 2005    (FR)    .................................. 05 04596

(51) Int. Cl.
   *B62J 1/00*    (2006.01)
   *B62J 1/08*    (2006.01)
(52) U.S. Cl. ................. 297/215.13; 297/195.1
(58) Field of Classification Search ............ 297/215.13, 297/195.1
See application file for complete search history.

(56) References Cited

U.S. PATENT DOCUMENTS

| | | | | | |
|---|---|---|---|---|---|
| 617,831 | A | * | 1/1899 | Irish et al. ........... | 297/215.13 X |
| 3,861,740 | A | * | 1/1975 | Tajima et al. .......... | 297/215.13 |
| 4,150,851 | A | * | 4/1979 | Cienfuegos ............ | 297/215.13 |
| 4,850,733 | A | * | 7/1989 | Shook ................ | 297/215.13 X |
| 4,900,049 | A | * | 2/1990 | Tseng ..................... | 280/281.1 |
| 5,044,592 | A | * | 9/1991 | Cienfuegos ......... | 297/215.13 X |
| 5,052,848 | A | * | 10/1991 | Nakamura ........... | 280/281.1 X |
| 5,062,617 | A | * | 11/1991 | Campbell ................... | 267/132 |
| 5,382,039 | A | * | 1/1995 | Hawker .............. | 297/215.13 X |

(Continued)

FOREIGN PATENT DOCUMENTS

CH        227 485 A     6/1943

(Continued)

OTHER PUBLICATIONS

International Search Report of PCT/FR2006/000834 filed Apr. 14, 2006, date of mailing Aug. 2, 2006.

*Primary Examiner*—Rodney B White
(74) *Attorney, Agent, or Firm*—Young & Thompson

(57) ABSTRACT

The device includes a tubular fitting (6) that is part of a bicycle frame and able to accommodate a saddle post (7), elements (19,20) for locking the saddle post (7) in rotation, and members (8) for holding the saddle post (7) in a longitudinal position that is determined relative to the tubular fitting (6). The holding members comprise a stop surface (7*a*) that is provided on the saddle post (7) and able to work with a stop (8) that is provided on the fitting (6) so as to delimit the insertion length of the saddle post (7) in the latter. The holding members also include at least one annular crosspiece (9, 10) that can be arranged between the stop surface and the stop so as to allow the adjustment of the insertion length.

17 Claims, 4 Drawing Sheets

U.S. PATENT DOCUMENTS

| | | | |
|---|---|---|---|
| 5,881,988 A * | 3/1999 | Liu | 297/209 X |
| 6,050,585 A | 4/2000 | Rai | |
| 6,202,971 B1 * | 3/2001 | Duncan | 297/215.13 X |
| 6,354,557 B1 * | 3/2002 | Walsh | 297/215.13 X |
| 6,499,800 B2 * | 12/2002 | Morgan, Jr. | 297/215.13 X |
| 6,631,947 B2 * | 10/2003 | Faltings | 297/195.1 |
| 6,663,076 B1 * | 12/2003 | Tsai | 297/195.1 |
| 6,957,856 B2 * | 10/2005 | Chiang et al. | 297/215.13 X |
| 7,025,522 B2 * | 4/2006 | Sicz et al. | 297/215.13 X |
| 7,226,065 B2 * | 6/2007 | Hutson | 297/215.13 X |
| 7,258,358 B2 * | 8/2007 | Fukui | 297/215.13 X |
| 2006/0078376 A1 * | 4/2006 | Liao | 403/378 |
| 2006/0175792 A1 * | 8/2006 | Sicz et al. | 297/215.13 X |
| 2006/0237946 A1 * | 10/2006 | Hutson | 297/215.13 X |

FOREIGN PATENT DOCUMENTS

| | | |
|---|---|---|
| DE | 805 350 | 5/1951 |
| DE | 196 30 839 A1 | 4/1997 |
| DE | 202 13 890 U1 | 11/2002 |
| FR | 2 618 120 A2 | 1/1989 |

* cited by examiner

SADDLE POST SUPPORTING DEVICE

This invention relates to a saddle post supporting device, in particular for attaching a bicycle saddle to a bicycle frame.

BACKGROUND OF THE INVENTION

The attaching of a saddle to a bicycle frame is done using a saddle post that holds means for attaching the saddle to one of its ends, whereas its opposite end is suitable for working with a supporting device by being inserted into a tubular fitting of the latter.

This fitting can consist directly of the top end of a saddle tube of the bicycle frame or a tubular element that is arranged in the saddle tube, in the intersection of the latter and the upper tube of the bicycle frame. The fitting has an inside dimension that is adapted to the outside dimension of the post so as to make it possible for the post to slide inside the fitting in the vertical direction to allow the vertical adjustment of the saddle relative to the crankset shaft for adaptation to the size of the bicyclist.

The supporting device comprises means for locking the saddle post in rotation, as well as means for holding the saddle post in a longitudinal position that is determined relative to the tubular fitting to adjust the height of the saddle. In general, a single tightening device acts as means for locking in rotation, as well as means for holding the saddle post by securing the latter after a certain length of it, which in general should not be less than about 60 mm, is inserted into the fitting.

To achieve the tightening of the saddle post inside the fitting, the latter, at its upper end, generally is slotted, and the tightening device can quite simply consist of a bolt that extends crosswise to bring together the two opposite edges of the fitting until sufficient tightening is exerted on the saddle post relative to the weight of the bicyclist, under all conditions of use.

According to a very common variant, the tightening device comprises a separate tightening collar that is arranged at the top end of the slotted fitting.

DESCRIPTION OF THE RELATED ART

An example of such a collar is illustrated in DE 295 00 596. It is also used in DE 202 13 890, which describes a saddle post fitted with a spring that is used as a shock absorber.

Furthermore, other saddle post supporting devices that make it possible to adjust the height of the saddle using an air spring as in the case of an office chair are known. Such a device is known from DE 196 30 839, which describes a two-part saddle post, of which an upper part is mounted to slide into a lower part that contains an air spring that can push the upper part upward to adjust the height of the saddle. The insertion length of the lower part of the saddle post can be adjusted using conventional tightening means such as those mentioned above.

Also, another type of saddle post supporting device is described in U.S. Pat. No. 6,050,585, in which the height of the saddle is adjusted using a saddle post that comprises a motorized screw engaged with a nut that is attached to the inside of the saddle tube. A similar device, but with a spring instead of the screw-nut unit, is described in FR 2 618 120.

Also, another saddle post supporting device is described in GF 219 877, in which the height of the saddle is adjusted using a threaded saddle post and toothed rings slipped onto the saddle post so as to keep it from rotating.

Also, another saddle post supporting device is described in the documents DE 805 350, US 2004/129471 and U.S. Pat. No. 6,478,278, according to which the height of the saddle is adjusted by locking the saddle post in different positions using transverse pieces extending into the through holes made in the wall of the saddle tube.

A saddle post supporting device of another type is described in CH 227 485, which comprises means for adjusting the height of the saddle by locking the saddle post in different positions using pawls that work with a rack inside the saddle tube or else with holes provided on the saddle post.

All of these known saddle post supports are more or less complicated to use and have a relatively high production cost.

In addition, even if this principle of tightening the saddle post allows a significant height adjustment, it bears a non-negligible weight of the supporting device/saddle post unit because at the minimum insertion length of the post of about 60 mm, it is necessary to add the post length that is necessary to the height adjustment of the saddle relative to the crankset shaft.

Another drawback appeared with the development of bicycle frames that often comprise an upper tube that is no longer horizontal but is inclined toward the rear; this tends to elongate the free part of the saddle post further, whereby the latter should remain at the same height. This increases the forces at the point where the saddle post is embedded in the fitting, whereby the lever arm becomes larger.

Thus, to resist these forces, the sizing of the fitting and the saddle post should be reinforced, which produces an additional increase in the weight of these elements.

Another problem comes from the fact that to eliminate any sliding of the saddle post inside the saddle tube, under the effect in particular of the weight of the bicyclist, it is necessary to provide a relatively high tightening force, whereas the thicknesses of these tubes are thin and whereas the friction coefficient is sometimes very low, such as, for example, in the case of frame tubes made of composite material.

SUMMARY OF THE INVENTION

The object of the invention is to eliminate the drawbacks of the previously known saddle post supports by proposing a saddle post supporting device that ensures a positive stop for the saddle post by replacing the conventional friction connection with a connection that employs an obstacle that is different from the known means in the prior art, while allowing the adjustment of the insertion length of the saddle post in the saddle fitting in an extremely simple and reliable manner.

According to another aspect of the invention, the saddle post supporting device according to the invention also effectively eliminates any sliding of the saddle post and in addition is able to offer a shock-absorbing effect. At the same time, a compensation for the radial play from the bottom of the saddle post to the inside of the fitting is obtained so as to prevent any floating of the saddle post, which otherwise can be unpleasant and even troublesome for the bicyclist.

The object of the invention is a saddle post supporting device that comprises a tubular fitting that is part of a bicycle frame and able to accommodate a saddle post, means for locking said saddle post in rotation, and means for holding the saddle post in a longitudinal position that is determined relative to said tubular fitting, whereby said holding means comprise a stop surface that is provided on said saddle post and able to work with a stop that is provided on said fitting so as to delimit the insertion length of the saddle post in the latter, characterized by the fact that said holding means also comprise at least one annular crosspiece that can be arranged between said stop surface and said stop so as to allow the adjustment of said insertion length.

According to other characteristics of the invention:
Several crosspieces are arranged against one another so as to form a stack;
The length of the crosspieces varies from one crosspiece to the next;
Said at least one crosspiece is made of an elastic material;
Said saddle post comprises an auxiliary connecting means that makes it possible to connect said at least one crosspiece to said saddle post to form a preassembled unit before mounting the saddle post on said fitting;
Said stop is formed by a shoulder on the inside wall of said fitting, that said stop surface consists of the end face of said saddle post, and said at least one annular crosspiece is arranged inside said fitting, between said shoulder and said end face of said fitting;
Said auxiliary connecting means comprises a sleeve of which one of the ends is sized so as to be introduced into the saddle post and of which the other end is provided with a collar that is sized to be introduced into said fitting such that its lower face rests on said stop, whereas its upper race constitutes a support surface for a crosspiece that is slipped on said sleeve;
Said sleeve comprises several longitudinal slots that extend downward from its top end so as to provide a certain transversal flexibility to this top end;
At its top part, said sleeve has an outside dimension that is slightly larger than the inside dimension of the saddle post such that the sleeve is held by friction inside the latter;
Said upper part of the sleeve comprises, on its outside periphery, a series of annular grooves;
Said sleeve is made of an elastic material;
A ring made of elastic material is inserted between said stop and the low end of the saddle post;
The upper face of said ring is conical for working by means of mating shapes with a conical lower surface of the low end of the saddle post;
The low end of the saddle post is beveled so as to rest on the upper surface of a beveled crosspiece in a complementary manner;
Said stop consists of the end face of said fitting; said stop surface is formed by an annular upper shoulder on the periphery of said saddle post, and said at least one annular crosspiece is slipped onto said saddle post, below said upper shoulder;
Said auxiliary means for connecting said at least one crosspiece to said saddle post comprises ribs that are provided on one or another of the interfaces between said at least one crosspiece and said saddle post;
Said auxiliary means for connecting said at least one crosspiece to said saddle post comprises a ring that is made of elastic material that is slipped on said saddle post below said crosspiece so as to hold the latter in place on said saddle post;
The peripheral surface of said fitting, said at least one crosspiece, and said saddle post above said shoulder, are aligned when the latter is inserted into said fitting;
The device also comprises means for holding said saddle post inside said fitting, whereby these holding means are integrated in said saddle post;
Said holding means comprise an expansion ring that is made of an elastic material that is slipped on said saddle post resting against a lower annular shoulder on the periphery of the latter, and tightening means that can radially deform said ring that is made of elastic material;
Said tightening means comprise a tightening element that consists of an end plate that is connected to the low end of said saddle post, and screw and nut means that push said plate toward said ring;
Said low end of said saddle post is accommodated with axial play in a housing of complementary shape on the upper face of said plate;
Said nut is a tubular nut that works with a screw whose head projects over the upper part of said saddle post;
At its low end, said tubular nut is equipped with a flange that is accommodated in a housing of complementary shape on the lower face of said tightening element;
Said screw top projects into an open recess toward the outside so as to allow the tightening of the screw after said saddle post is mounted in said fitting;
Said holding means comprise two expansion rings made of elastic material and a third ring made of rigid material that is arranged between the first two.

BRIEF DESCRIPTION OF THE DRAWINGS

Other characteristics and advantages of the invention will emerge from the following description of two nonlimiting embodiments of the invention, with reference to the accompanying figures, in which.

In the figures, the identical or equivalent elements will have the same references.

DETAILED DESCRIPTION OF THE PREFERRED EMBODIMENTS

Figure 1:
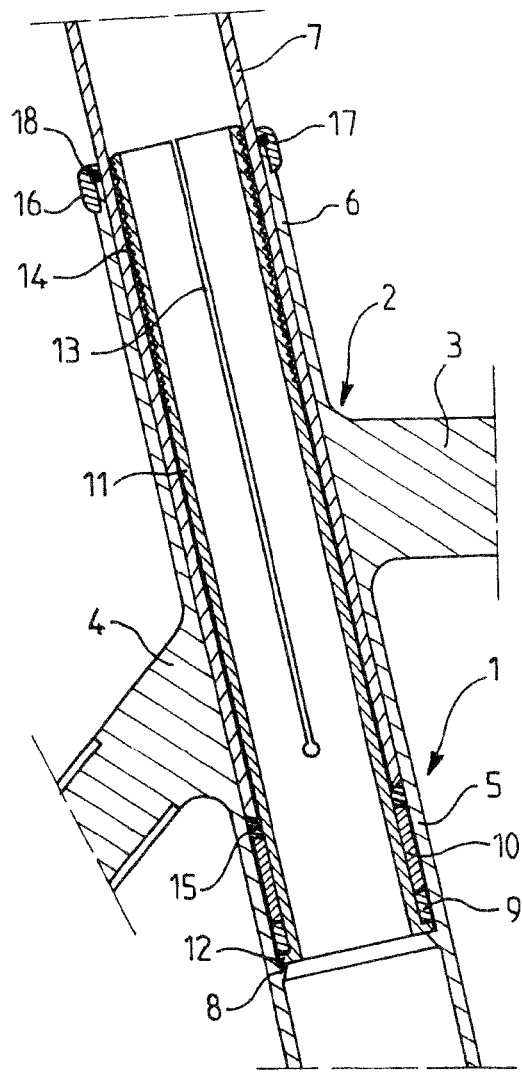
FIG. 1 is a partial longitudinal cutaway view of a saddle post support according to a first embodiment of the invention.
Figure 2:
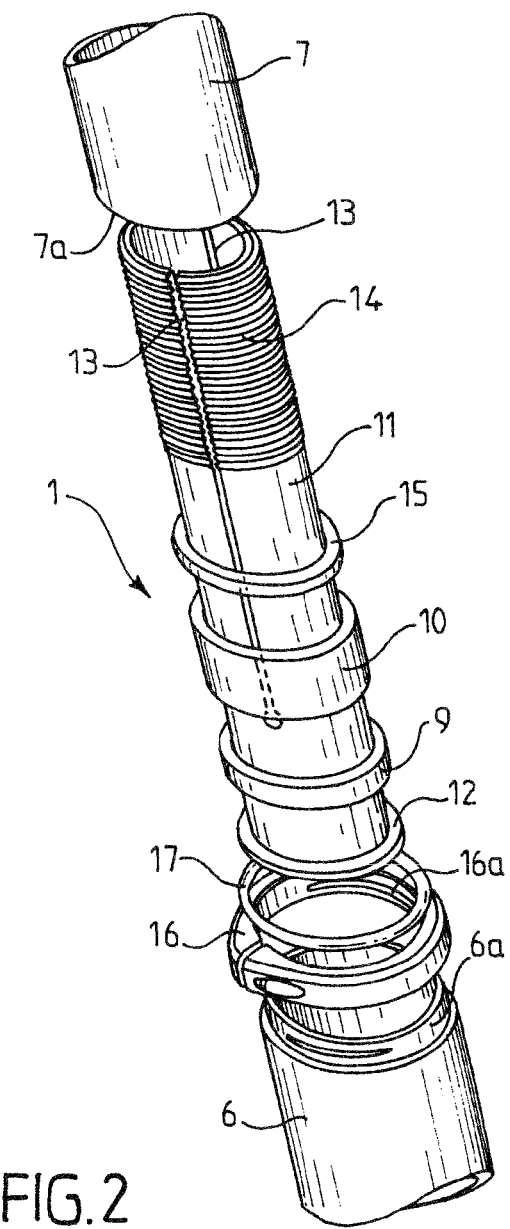
FIG. 2 is an exploded perspective view of the saddle post support of FIG. 1.

FIGS. 1 and 2 are partial views showing the portion of a bicycle frame in which a saddle post supporting device 1 according to a first embodiment of the invention is integrated. This part of the bicycle frame can be designed as a saddle coupling node 2, in which an upper tube 3, braces of which one (4) is visible in FIG. 1, as well as a saddle tube 5 are brought together.

The upper part of the saddle tube 5 comprises a tubular saddle post fitting 6. In the illustrated example, the saddle post fitting 6 consists of the top end of the saddle tube 5 that is sized to accommodate a saddle post 7.

The means for holding the saddle post 7 in a longitudinal position that is determined relative to the tubular fitting 6 comprises a stop 8 (see FIG. 1).

In a first embodiment, the stop 8 is arranged on the inside wall of the fitting. This stop 8 is arranged so as to delimit the insertion length of the saddle post 7 in the fitting 6 by working with a stop surface 7a that in this first embodiment consists of the low end face of the saddle post 7. The stop 8 halts and thus holds the saddle post in a determined longitudinal position.

The stop 8 is preferably defined by an annular shoulder that extends over the entire inside periphery of the fitting 6. In the example illustrated in FIGS. 1 and 2, the fitting 6 as well as the saddle post are cylindrical and, consequently, the shoulder 8 is circular in this case.

In the simplest implementation of the supporting device, the surface of the low end 7a of the saddle post 7 rests directly on the shoulder 8, but in this case, the only possibility for adjusting the height of the saddle relative to the crankset shaft (not shown) consists in using different saddle post lengths or else in cutting the saddle post to the desired length.

Such a solution, however, is not very practical, and for this reason, an essential characteristic of the invention consists in providing a crosspiece 9 inside the saddle post fitting 6, between the stop surface 7a that is formed by the low end of the saddle post 7 and the stop 8.

This crosspiece 9 maintains the spacing between these two elements and consequently modifies the insertion length of the saddle post 7 in the fitting 6. It thus makes it possible to adjust the height of the saddle to the position that is selected by the bicyclist.

The crosspiece 9 can be obtained in a single piece by cutting a crosspiece blank so as to obtain the desired length. This relatively simple solution, however, no longer allows the position of the saddle to be adjusted later to a greater height.

For this reason and to obtain a maximum progressiveness that comes as close as possible to the conventional continuous adjustment of the longitudinal position of a saddle post, it is also proposed to provide several crosspieces 9, 10 of different lengths. These crosspieces are advantageously provided with the saddle post optionally in the form of a set and they are then carefully selected by the bicyclist to provide in combination a stack of desired length or, failing this, very close to the latter.

The peripheral shape of the crosspieces 9, 10 is illustrated as circular in the example, but these crosspieces can, of course, have a non-circular peripheral shape. This shape, however, should always be adapted to the shape of the inside wall of the fitting 6.

It is desirable that the user can adjust the height of the saddle and therefore the installation or the modification of the stack of crosspieces in the most convenient manner possible. These elements, however, are inside the saddle tube 5 and are therefore not very accessible.

To facilitate the manipulation of the crosspieces, the supporting device advantageously comprises, as is illustrated in FIGS. 1 and 2, an auxiliary connecting means that makes it possible to bring out the crosspieces, whether the saddle post 7 is present in the fitting 6 or absent from the latter.

This auxiliary means consists of a sleeve 11, of which one of the ends, called the top end, is sized so as to be introduced into the saddle post 7 and of which the other end, said low end, is equipped with a collar 12 that is sized so as to be introduced into the fitting 6. The lower face of the collar thus rests on the stop 8, whereas its upper surface consists of a support surface for the crosspiece 9 that is annular to be slipped on the sleeve 11, whereas in the illustrated example, a second crosspiece 10, also annular, is arranged against the crosspiece 9.

In this case, the stop surface 7a that is formed by the low end of the saddle post 7 works with the stop 8 by means of the collar 12 and crosspieces 9 and 10.

The length of this sleeve 11 may correspond to the desired length for the adjustment, increased by the minimum insertion length of the saddle post 7 inside the frame, which is about 60 mm.

It thus is possible to prepare the stack of crosspieces 9, 10 outside the fitting 6 directly on the sleeve 11, which then is introduced in the fitting, following which the saddle post 7 is introduced in the fitting, between the latter and the sleeve in the annular space that is defined between these two elements to rest against the crosspiece 10.

The sleeve 11 advantageously comprises several longitudinal slots 13 that extend downward from its top end so as to provide a certain transverse flexibility to the top part of the sleeve so as to facilitate the introduction of the latter inside the saddle post 7.

The sleeve 11 preferably then has at its top part an outside dimension that is slightly larger than the inside dimension of the saddle post such that the sleeve is held by friction inside the latter. So as to improve the friction, the sleeve also comprises a series of annular grooves 14 on its outside periphery.

A unit that is preassembled separately outside the fitting 6 and easy to mount in the latter is thus obtained.

During an optional replacement of an adjustment crosspiece 9, 10, the removal of the stack of crosspieces 9, 10 is done using the slotted tubular sleeve 11. Actually, the sleeve 11 is tightened, using elasticity slots 13, inside the saddle post 7, and therefore to extract the latter, it is necessary only to remove the entire preassembled unit with all the pieces that are inside the fitting 6.

The supporting device 1 also advantageously comprises an elastic ring 15 that is arranged directly below the low end of the saddle post 7, between the latter and the stop 8. In the illustrated example, the crosspieces 9, 10 are also inserted between these elements.

This elastic ring 15 acts as a shock absorber. It can have an overall rectangular section, but so as to also ensure the lateral holding of the saddle post 7 by eliminating the play inside the fitting 6, it advantageously has a conical upper face that narrows toward the bottom and is able to work by means of mating shapes with the lower surface of the low end of the saddle post 7, which then is also conical.

So as to obtain a shock-absorbing effect to moderate the oscillations and the vibrations during pedaling, it is conceivable, instead of using the ring 15, to make the crosspieces 9, 10 from an elastic material and/or also the sleeve 11 itself from an elastic material. In this variant, the slots 13 of the sleeve 11 can be eliminated, even if the sleeve in its top part has an outside dimension that is slightly greater than the inside dimension of the saddle post, such that the sleeve is held by friction inside the latter.

So as to ensure the seal of the fitting 6, the latter, in the embodiment illustrated in FIGS. 1 and 2, is equipped at its top end with a tightening collar 16 that is combined with a sealing joint 17 that is arranged in a groove 18 in the inside face of the latter. The tightening collar is mounted on the end of the fitting 6 by a connection that ratchets on ribs 16a, 6a.

Figure 3:
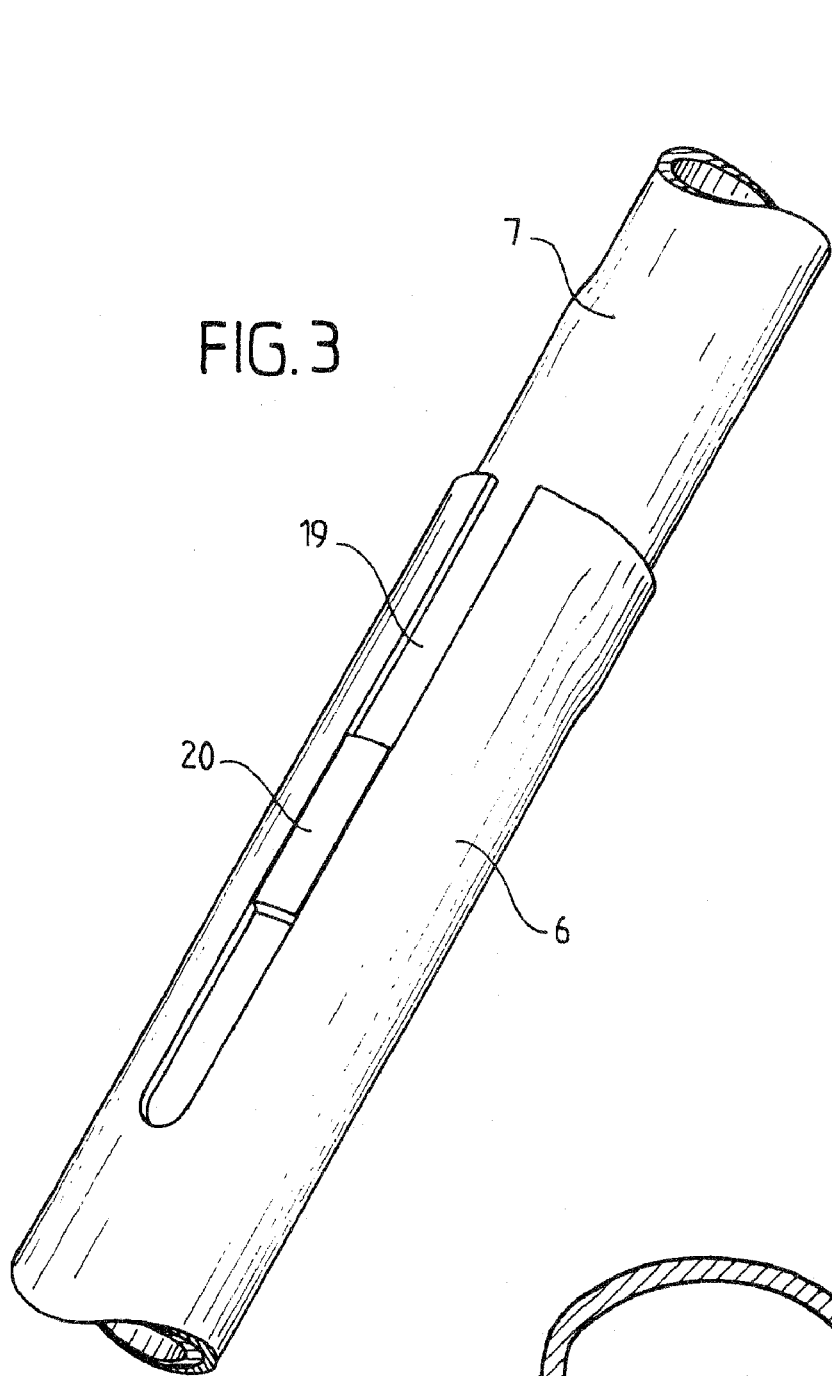
FIG. 3 is a partial view of a saddle post and a fitting that illustrates an example of means for locking the saddle post in rotation.

Regarding the means for locking the saddle post 7 in rotation inside the fitting 6, FIG. 3 illustrates an example of such means for locking in rotation in the case of circular shapes of the saddle post 7 and the fitting 6. In this example, at its top end, the fitting is equipped with a slot 19 that opens upward and constitutes a guide slot for a key 20 that is attached to the outside face of the saddle tube 7.

Figure 4:
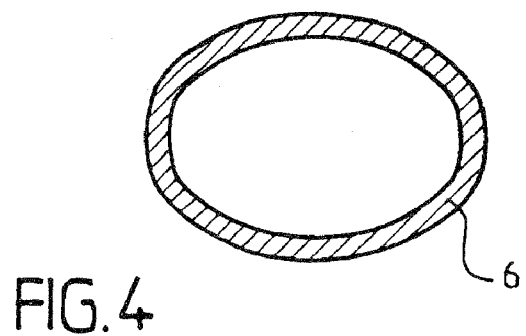
FIG. 4 is a transversal cutaway view of a saddle post that illustrates another example of means for locking the saddle post in rotation by a non-circular shape.

In addition, there are several solutions based on shapes of sections of the saddle post and of the fitting and, if necessary, of the sleeve 11. The sections can have, for example, an essentially oval shape as is illustrated in FIG. 4 in the example of this transverse section of a fitting 6. The sections can have, of course, any non-circular shape, such as, for example, a square, rectangular, or hexagonal shape, etc.

Figure 5:
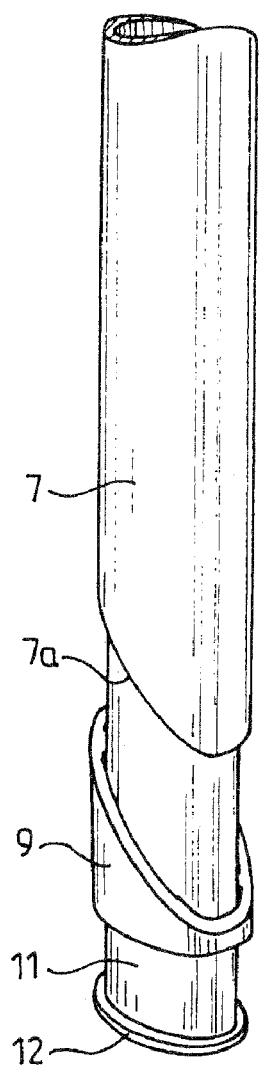
FIG. 5 is a perspective view that illustrates a variant of the first embodiment of the invention, whereby these elements are shown slightly separated to facilitate the understanding of this variant.

FIG. 5 shows that the sleeve 11, the collar 12 of the latter, the crosspiece 9 and the saddle post have an essentially oval section to be adapted to the shape of the fitting 6 of FIG. 4.

FIG. 5 also shows that the low end of the saddle post 7 is a beveled variant so as to rest on the upper surface of the beveled crosspiece 9 in a complementary manner. Preferably, the crosspiece is an elastic material here for obtaining an automatic and effective compensation for the play inside the saddle post fitting during use.

Figure 6:
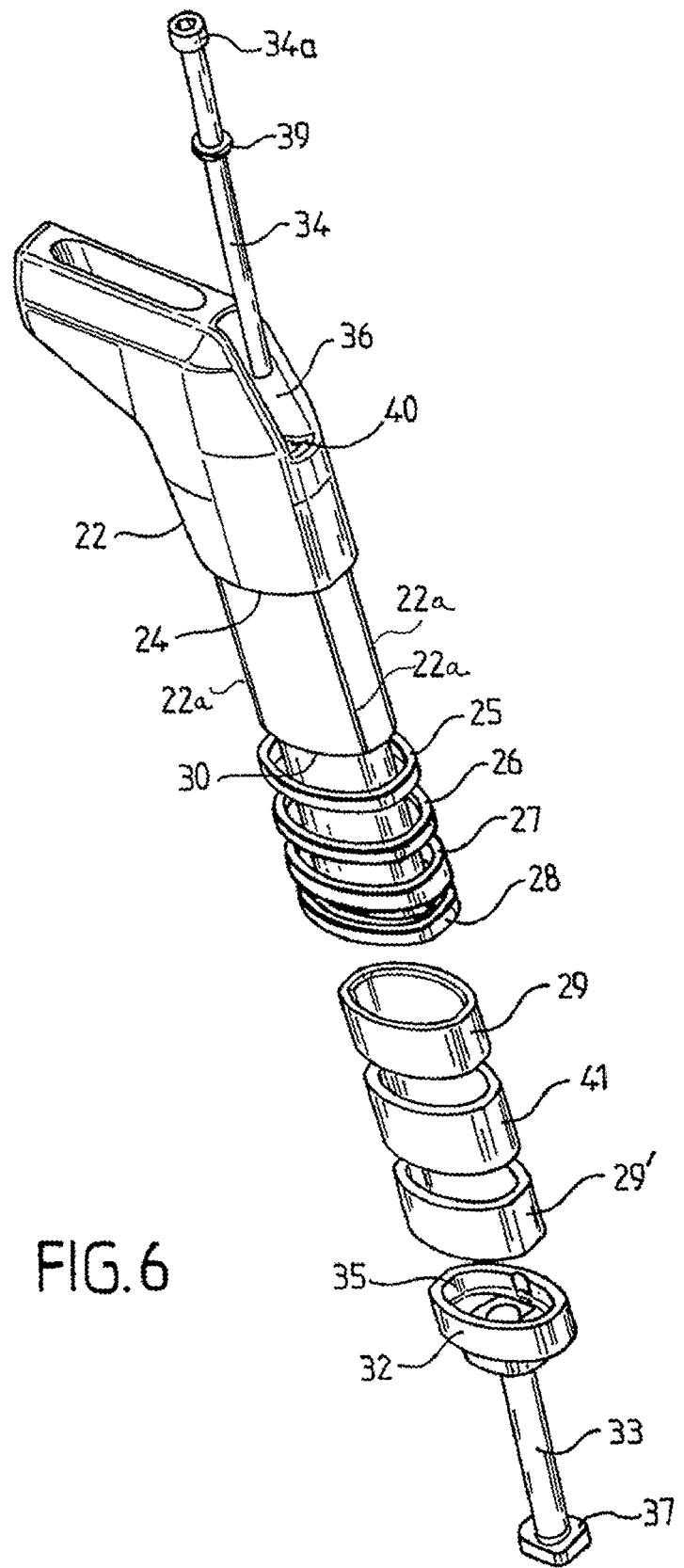
FIG. 6 is an exploded perspective view of a saddle post that is part of a saddle post support according to a second embodiment of the invention.
Figures 7, 8:
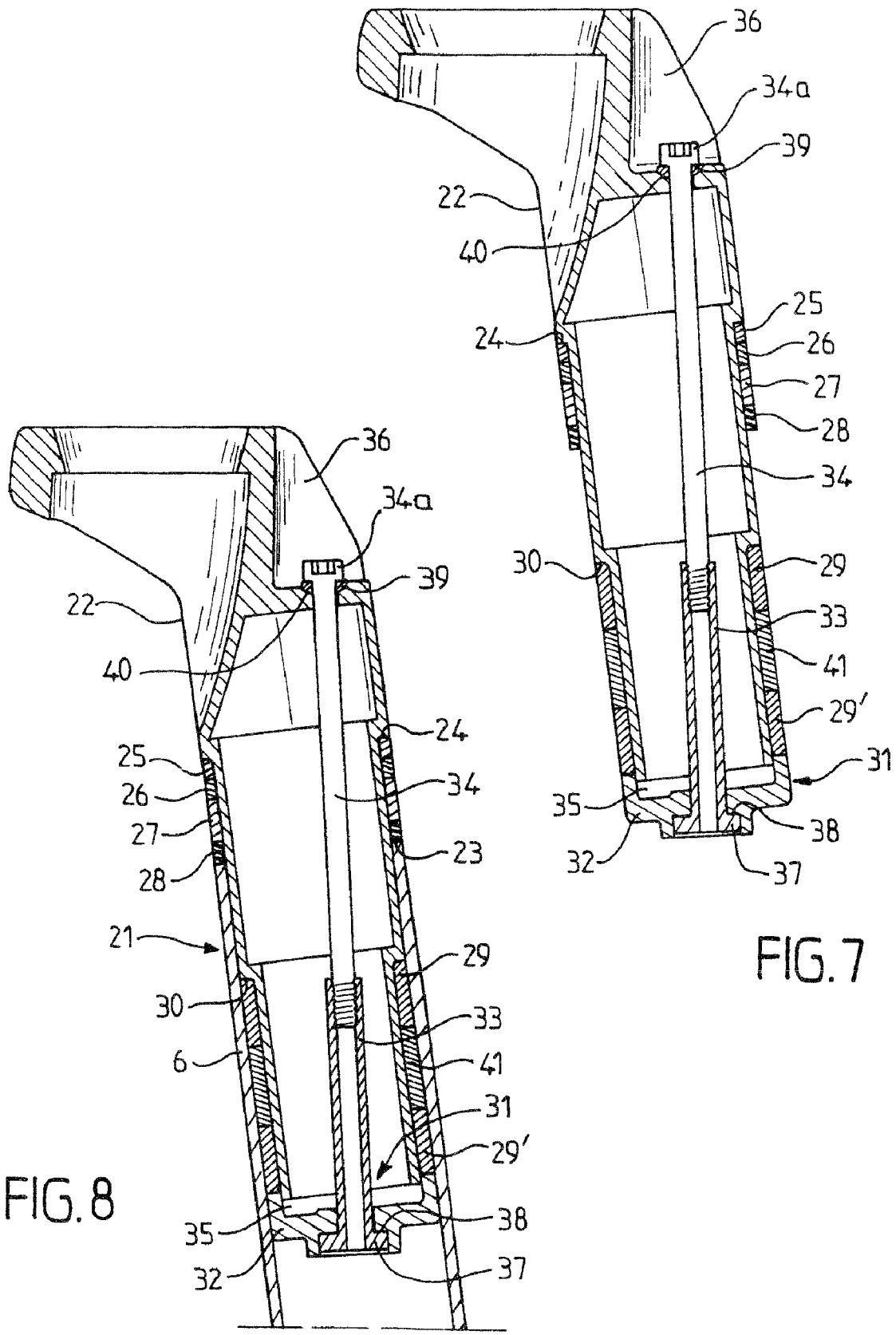
FIG. 7 is a longitudinal cutaway view of the saddle post of FIG. 6, after the means that form an expander on the post are assembled.
FIG. 8 is a longitudinal cutaway view of the saddle post of FIG. 7, after its insertion into a fitting.

FIGS. 6 to 8 illustrate a second embodiment of a saddle post supporting device 22 according to the invention.

As in the first embodiment, this supporting device 21 comprises a tubular fitting 6 (see FIG. 8) that consists of the top end of a saddle tube. The supporting device is able to accommodate a saddle post 22 and comprises means for locking the latter in rotation. These locking means can advantageously, as already mentioned, consist of the non-circular shape of the saddle post 22 and the saddle post fitting 6 whose inside wall has a shape that is complementary to that of the saddle post.

The saddle post supporting device 22 also comprises means of holding the saddle post 22 in a longitudinal position that is determined relative to the fitting of the saddle post 6. According to this second embodiment, the means of holding the post comprises a stop that consists of the end face 23 of the fitting 6 that is able to work with a stop surface on the saddle post 22. This stop surface consists of an annular upper shoulder 24 that is provided on the periphery of the saddle post.

According to an essential characteristic of the invention, the holding means also comprise at least one annular crosspiece that can be arranged between the stop surface 24 and the stop 23 so as to make possible the adjustment of the insertion length of the saddle post 22 in the fitting 6. In the illustrated example, several crosspieces 25, 26 and 27 with different lengths are used so as to obtain more flexibility during the adjustment of the insertion length of the saddle post. The crosspieces 25, 26 and 27 are arranged against one another so as to form a stack.

The supporting device 21 advantageously also comprises an elastic ring 28 that takes the shape here of an annular seal that is arranged directly below the lowest crosspiece 27 so as to act as a shock absorber by reducing the oscillations and vibrations that are induced during use by the irregularities of the road and transmitted to the saddle post.

So as to obtain a shock-absorbing effect to moderate the oscillations and vibrations during pedaling, it is conceivable, instead of using the ring 28, to make crosspieces 25 to 27 from an elastic material.

The elastic ring 28, however, can provide an additional advantage by being used as an auxiliary connecting means by holding the crosspiece or crosspieces 25 to 27 on the saddle post 22 to form a preassembled unit before the assembly of the saddle post on the fitting 6. In this case, the inside section of the seal can be slightly lower than that of the saddle post 22 so as to obtain an elastic deformation during the assembly.

This auxiliary connecting means could also consist of ribs 22a that are provided on one or the other of the interfaces between said at least one crosspiece and said saddle post, and more specifically on the inside face of the crosspiece or crosspieces 25 to 27 or else on the saddle post 22 as shown in FIG. 6 so as to provide a certain friction between these elements.

The saddle post supporting device according to this second embodiment also advantageously comprises means for holding the saddle post 22 inside the fitting 6 instead of the conventional tightening devices such as the collars. In a general manner, the holding means should ensure the holding of the saddle post in the fitting for the case where the bicyclist lifts the bike by taking it by the saddle. The sudden disengagement of the post is actually able to cause an accident or at least a deterioration of the material. Thus, the minimum holding force should not be less then 400 Newtons.

The holding means according to the invention are integrated into the saddle post 6 and are able to ensure the necessary holding without generating excessive forces inside the fitting, as well as on the saddle post 22 itself. This is particularly important for the competition frame elements whose walls are relatively thin.

The holding means according to the invention comprise an expansion ring 29 that is made of an elastic material such as an elastomer, whereby this ring is slipped on the saddle post 22 resting against a lower annular shoulder 30 on the periphery of the saddle post.

The expansion ring is combined with tightening means 31 comprising a tightening element that consists of an end plate 32 that is connected to the low end of the saddle post 22. They also comprise means with nut 33 and screw 34 that push the plate 32 toward the expansion ring 29 so as to deform it radially.

The expansion ring 29 thus performs two roles, on the one hand to hold the saddle post 22 in the fitting 6, and on the other hand to compensate for the radial play that may exist between the outside wall of the saddle post and the inside wall of the fitting. A very unpleasant and even troublesome floating effect, which is due to excessive radial play, is thus eliminated for the bicyclist.

The low end of the saddle post 22 is accommodated with axial play in a housing 35 with a complementary shape that is provided on the upper face of the end plate 32 before carrying out a relative axial movement in relation to the latter during the tightening using the screw 34 whose head 34a projects over the upper part of the saddle post 22, more specifically in a recess 36 that is open toward the outside on the side that is directed toward the front of the saddle post.

The nut 33 passes through the end plate 32 and is equipped at its low end with a flange 37 that is accommodated in a housing 38 of complementary shape on the lower face of the end plate 32. This shape is advantageously square so as to be used for locking the nut 33 in rotation during the tightening of the screw 34.

Because the screw is slightly inclined inside the saddle post 22, the screw advantageously can be equipped with a washer 39 with a curved or spherical lower face to be accommodated in a cavity 40 of complementary shape in the bottom of the recess 36 in the upper part of the saddle post 22.

Finally, the holding means can comprise, as is illustrated in FIGS. 6 to 8, two expansion rings 29 and 29' that are made of an elastic material such as an elastomer, and a third ring 41 that is made of a rigid material and is arranged between the first two.

Furthermore, the peripheral surfaces of the crosspieces 25 to 27 and the saddle post 22 above the shoulder 24 are, when the saddle post is inserted in the fitting 6, advantageously aligned on the peripheral surface of the latter so as to form a continuous piece without the protruding parts present on conventional tightening devices. Thus, a saddle post that constitutes a natural extension of the saddle fitting is obtained.

The invention claimed is:
1. A saddle post supporting device, comprising:
a tubular fitting (6) configured to be part of a bicycle frame and to accommodate a saddle post (7; 22);
means (19, 20) for locking said saddle post (7) in rotation; and means (7a, 8; 23, 24) for holding said saddle post (7; 22) in a longitudinal position that is determined relative to said tubular fitting (6), wherein said holding means comprise a stop surface (7a; 24) provided on said saddle post (7; 22) and configured to work with a stop (8; 23) provided on said fitting (6) so as to delimit an insertion length of the saddle post (7; 22) in the fitting (6), and wherein said holding means (7a, 8; 23, 24) also comprise at least one annular crosspiece (9, 10; 25 to 27) configured to be arranged between said stop surface (7a; 24) and said stop (8; 23) so as to allow an adjustment of said insertion length.

2. The supporting device according to claim 1, wherein several of said crosspieces (9, 10; 25 to 27) are arranged against one another so as to form a stack.

3. The supporting device according to claim 2, wherein a length of the crosspieces (9, 10; 25 to 27) varies from one crosspiece to the next.

4. The supporting device according to claim 1, wherein said at least one crosspiece (9, 10; 25 to 27) is made of an elastic material.

5. The supporting device according to claim 1, wherein said saddle post (7; 22) comprises an auxiliary connecting means (11, 12; 28) configured to connect said at least one crosspiece (9, 10; 25 to 27) to said saddle post (7; 22) to form a preassembled unit before the saddle post is mounted on said fitting (6).

6. The supporting device according to claim 1,
wherein said stop (23) consists of the end face of said fitting (6),
wherein said stop surface is formed by an annular upper shoulder (24) on the periphery of said saddle post (22), and
wherein said at least one annular crosspiece (25 to 27) is slipped on said saddle post, below said upper shoulder (24).

7. The supporting device according to claim 6, wherein an auxiliary connecting means of said at least one crosspiece (25 to 27) to said saddle post (22) comprises ribs located on an interface between said at least one crosspiece (25 to 27) and said saddle post (22).

8. The supporting device according to claim 6, wherein said auxiliary connecting means of said at least one crosspiece (25 to 27) to said saddle post (22) comprises a ring (28) made of elastic material slipped on said saddle post below said crosspiece (25 to 27) so as to hold said crosspiece in place on said saddle post (22).

9. The supporting device according to claim 6, wherein the peripheral surfaces of said fitting (6), of said at least one crosspiece (25 to 27), and of said saddle post (22) above said shoulder (24) are aligned when the saddle post (22) is inserted in said fitting (6).

10. The supporting device according to claim 6, further comprising:
means (29 to 34), integrated in said saddle post (22), for holding said saddle post (22) inside said fitting (6).

11. The supporting device according to claim 10,
wherein said holding means comprise an expansion ring (29, 29') made of an elastic material and configured to be slipped on said saddle post (22) resting against a lower annular shoulder (30) on the periphery of the saddle post, and
wherein said holding means further comprise tightening means (31) configured to radially deform said ring (29, 29').

12. The supporting device according to claim 11, wherein said tightening means (31) comprise a tightening element (32) that consists of an end plate connected to a low end of said saddle post (22), and screw means (34) and nut means (33) that push said plate toward said ring (29, 29').

13. The supporting device according to claim 12, wherein said low end of said saddle post (22) is accommodated with axial play in a housing (35) of a complementary shape on an upper face of said plate (32).

14. The supporting device according to claim 12, wherein said nut (33) is a tubular nut that works with a screw (34) with a head (34a) projecting on an upper part of said saddle post (22).

15. The supporting device according to claim 14, wherein, a low end of said tubular nut (33) is equipped with a flange (37) that is accommodated in a housing (38) of complementary shape on a lower face of said tightening element (32).

16. The supporting device according to claim 14, wherein said screw head (34a) projects into a recess (36) that is open toward the outside so as to allow the tightening of the screw (34) after said saddle post (22) is mounted in said fitting (6).

17. The supporting device according to claim 10, wherein said holding means comprise two expansion rings (29, 29') made of elastic material, and a third ring (41) made of rigid material arranged between the two expansion rings (29, 29') of elastic material.

* * * * *